United States Patent
Peinetti

[19]

[11] Patent Number: 6,065,427
[45] Date of Patent: May 23, 2000

[54] LOAD ACTIVATED ANIMAL CONTROL SYSTEM

[75] Inventor: Donald L. Peinetti, Chester Springs, Pa.

[73] Assignee: Invisible Fence Company, Inc., Malvern, Pa.

[21] Appl. No.: 09/102,297

[22] Filed: Jun. 22, 1998

Related U.S. Application Data

[60] Provisional application No. 60/050,545, Jun. 23, 1997.

[51] Int. Cl.[7] .............................. A01K 5/00; A01K 39/00
[52] U.S. Cl. ..................... 119/57.9; 119/52.3; 119/908
[58] Field of Search ................. 119/52.3, 57.9, 119/712, 721, 908, 174, 510

[56] References Cited

U.S. PATENT DOCUMENTS

| | | | |
|---|---|---|---|
| 2,856,898 | 10/1958 | Doubleday et al. | 119/57.9 |
| 5,150,665 | 9/1992 | Boaz | 119/52.3 |
| 5,191,857 | 3/1993 | Boaz | 119/52.3 |
| 5,285,747 | 2/1994 | Caldine | 119/57.9 |
| 5,392,732 | 2/1995 | Fry | 119/57.9 |
| 5,471,951 | 12/1995 | Collins | 119/57.9 |
| 5,894,814 | 4/1999 | Roslonski | 119/57.9 |
| 5,937,788 | 8/1999 | Boyd | 119/57.9 |

OTHER PUBLICATIONS

Boylestad, "Introductory Circuit Analysis", 5th Edition, (pp. 284–293), 1987.

Primary Examiner—Michael J. Carone
Assistant Examiner—James S. Bergin
Attorney, Agent, or Firm—Dann, Dorfman, Herrell & Skillman, P.C.

[57] ABSTRACT

A load-activated electronic animal control system is provided for detecting an animal load across actuating conductors. In response to detecting such a load, an electrical stimulus is delivered to the animal load across the actuating conductors. The control system may be used on avian structures such as bird feeding or nesting structures or on electric fences for livestock or other animals. Specifically, a load-activated electronic animal control system delivers an electrical stimulus to animals greater than a predetermined size when such animals contact defined actuating surfaces of the structure. Prior to activation, the control system maintains the system circuitry in a low-power state. Further, the electrical stimulus is only delivered to the actuating surfaces when a load is detected across such actuating surfaces.

21 Claims, 3 Drawing Sheets

LOAD ACTIVATED ANIMAL CONTROL SYSTEM

RELATED CASES

Priority is claimed herein under 35 U.S.C §119(e) to U.S. Application No. 60/050,545, filed Jun. 23, 1997.

FIELD OF THE INVENTION

This invention relates to animal control systems. More particularly, the present invention relates to a low-power, battery-operated system for discouraging undesired animals from bird feeding structures and the like.

BACKGROUND OF THE INVENTION

A common problem in suburban residential areas is the control of nuisance animals such as rodents, squirrels, raccoons, etc. Many residents erect bird houses or similar structures to provide shelter, nesting areas, and feeding stations for birds. Squirrels are naturally drawn to these structures due to the presence of the bird feed and the likely tree level locations of such structures. The presence of squirrels about the bird feeding structure can undesirably disrupt feeding and nesting, and diminish the amounts of feed available for consumption by birds.

It would be desirable to provide an animal control device which would discourage squirrels and the like from seeking access to seed structures without affecting the intended use.

SUMMARY OF THE INVENTION

According to one aspect of the invention, an electronic animal control system is provided for use with avian structures such as bird feeding or nesting structures. Specifically, a load-activated electronic animal control system delivers an electrical stimulus to animals greater than a predetermined size when such animals contact defined actuating surfaces of an avian structure. The electronic control system includes at least two actuating surfaces separated by a predetermined distance to effect delivery of the electrical stimulus to an animal of sufficient size to simultaneously contact at least two of the actuating surfaces.

According to another aspect of the invention, a bird feeding structure is provided in combination with a load activated animal control circuit. The circuit includes a power section for supplying electrical power, a logic control unit for detecting the presence of a load, an oscillating stage for creating an oscillating signal, a threshold stage for blocking the oscillating signal until it has surpassed a predefined threshold, and a stimulus delivery stage for delivering an electrical stimulus to an animal or load.

The power section maintains the system in a low-power standby mode until a probe surface and a circuit return path surface are simultaneously contacted by an animal or other electrical load. Upon contact, the logic control unit enables the oscillating stage. The oscillating stage, when enabled, produces an oscillating signal for input to the threshold stage. The threshold stage blocks the oscillating signal from being provided to the stimulus delivering stage until the oscillating signal reaches a defined threshold. Then, the oscillating signal is provided to the stimulus delivery stage where the voltage of the signal is increased and delivered to the animal. This process continues for a period of time defined by a time constant of the logic control unit in order to limit battery drain if the actuating surfaces are contacted by an electrical load that is immobile.

In a preferred embodiment, the power section includes a nine-volt cell. The bird feeding structure includes a first bird perch, a second bird perch, a base section and a lid section. The stimulus delivery stage includes a step-up transformer. The actuating surfaces are positioned for contact with an animal or other electrical load through the perches, lid, and base, which are sufficiently physically separated such that birds are not susceptible to contacting any two of the actuating surfaces simultaneously due to the relative small size of the birds.

In a broader application, the load-activated animal control system can be employed to maintain animals such as livestock within an electric fence. In such an application, the two activating contact surfaces may be provided as separate, spaced apart conductive strands of the electric fence. As such, the fence will be activated only upon contact of the activating surfaces by the animal thereby providing a load-activated electric fence.

Other aspects of the present invention will become apparent to those skilled in the art upon reading and understanding the following detailed specification and attached drawings.

BRIEF DESCRIPTION OF THE DRAWINGS

The foregoing Summary, as well as the following Detailed Description, will be best understood in connection with the attached Drawings in which.

DETAILED DESCRIPTION OF THE PREFERRED EMBODIMENTS

An electronic animal control system is provided for use with avian structures such as bird feeding or nesting structures. Specifically, a load-activated electronic animal control system delivers an electrical stimulus to animals greater than a predetermined size when such animals contact defined actuating surfaces of an avian structure.

A preferred embodiment of the system and method in accordance with the present invention will now be described with reference to the enumerated drawing figures. While the preferred embodiment incorporates a specific avian structure, it is within the scope of the invention to vary the application, structure, dimension, size and type of the disclosed embodiments so as to facilitate the application of the invention to a broad range of animal species. Further, the invention may be applied in other applications such as electric fences so as to provide, for example, load-activated animal fences for containing livestock.

Figure 1:
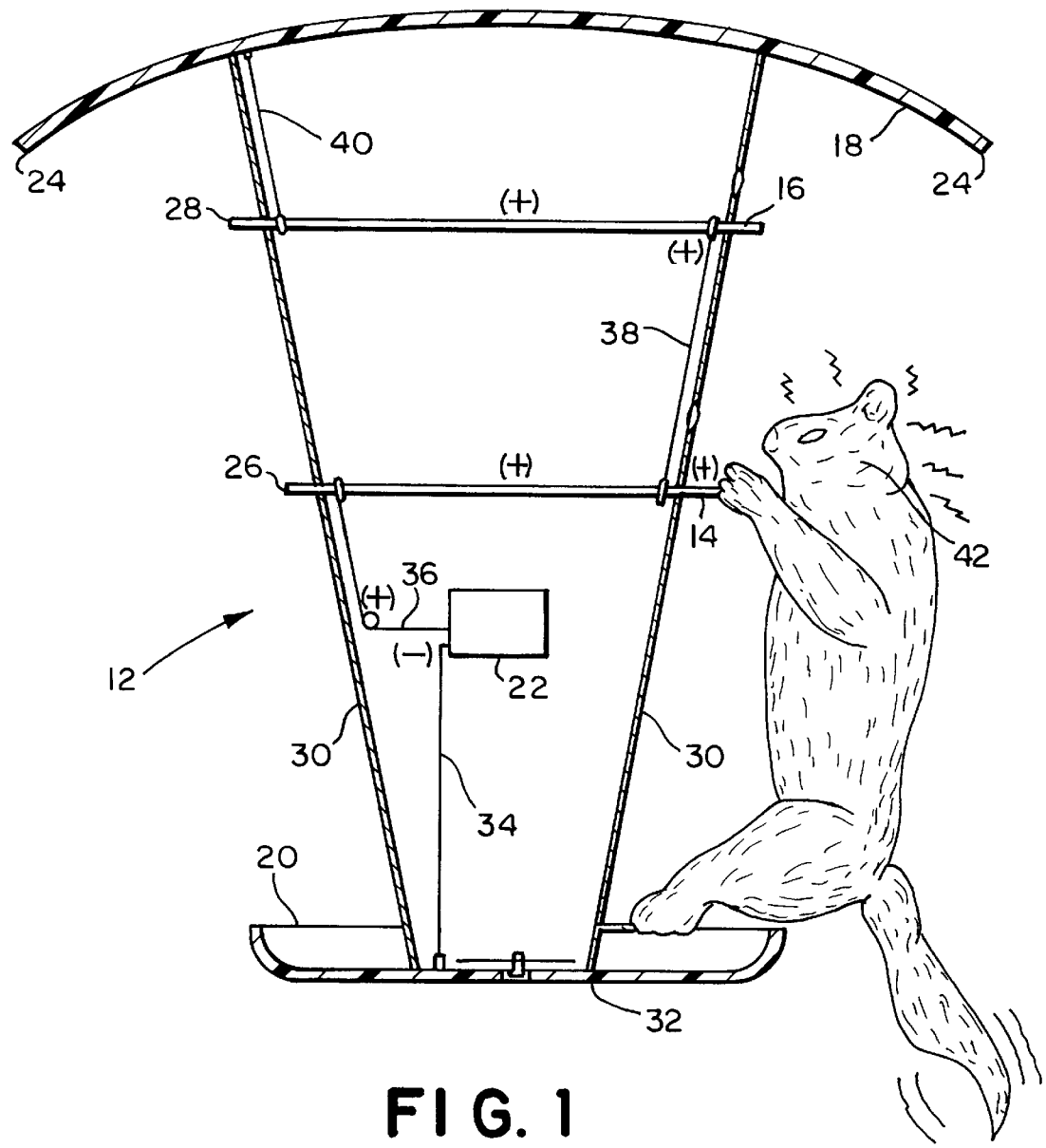
FIG. 1 is a schematic cross-sectional side elevational view of a bird feeding structure.

Referring to FIG. 1, there is shown a bird feeding structure 12. The bird feeding structure 12 is configured to provide a plurality of actuating surfaces such as probe contact surfaces 14, 16 and 18, as well as a circuit return path surface 20. The actuating surfaces provide input and output terminals to a load activated animal control circuit, generally designated 22, for detecting the presence of an animal (or other load) and for delivering an electrical stimulus to the animal. Bird feeding structure 12 can be configured to have various perch configurations and actuating surfaces. Moreover, structure 12 can be mounted on a traditional pole support extending upwardly from the ground or the structure 12 can be mounted by overhead or side supports. The desirable number and location of actuating surfaces, as well as the manner of integrating the actuating surfaces with an avian structure is within the range of design choices available to those reasonably skilled in the art.

The bird feeding structure 12 includes a lid 24, a first perch 26, a second perch 28, wall sections 30 and a base 32. The wall sections 30 preferably include an electrically insulative material. First perch 26, second perch 28, lid 24, and base 32 preferably include electrically conductive surfaces.

A probe lead wire 36 is connected from one terminal of control circuit 22 to an electrically conductive portion of first perch 26 which serves as a first activating surface. In a preferred embodiment, the first perch 26 is formed of a conductive rod which extends outwardly from structure 22 to provide probe contact surface 14.

A perch jumper wire 38 electrically connects second perch 28 with first perch 26. Second perch 28 provides probe contact surface 16 and serves as another first activating surface. Lid jumper wire 40 electrically connects second perch 28 with lid 24, thereby providing another probe contact surface 18 on the lid 24 which serves as yet another first activating surface.

A circuit return path wire 34 is connected between a second terminal of control circuit 22 and the base 32. The electrically conductive surface of base 32 provides circuit return path surface 20 as the second activating surface.

An animal 42, or other load, completes a circuit path between the terminals of the control circuit 22 by contacting circuit return path surface 20 and at least one probe contact surface, namely 14, 16 or 18. The circuit return path surface 20 is physically separated from any of the probe contact surfaces by a distance selected to be within a range of distances likely to be spanned by the physical dimension of an undesired animal, yet greater than a distance likely to be spanned by a bird of the type for which the structure is intended to be used.

Figure 2:
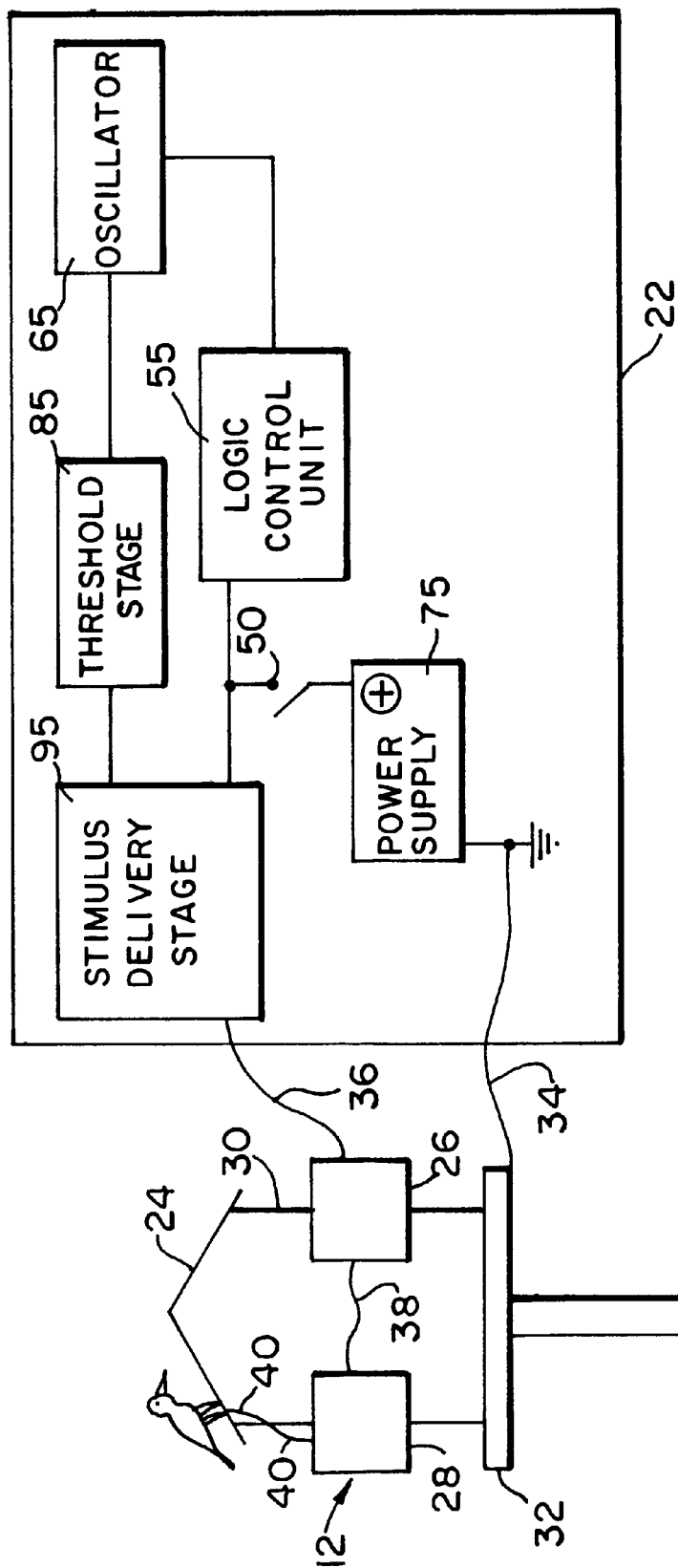
FIG. 2 is a functional block diagram of a load activated electronic animal control system for use with the bird feeding structure of FIG. 1.

Referring now to FIG. 2, there is shown a functional block diagram of the bird feeding structure 12 and the load activated control circuit 22.

The power section 75 provides power for circuit 22. The power section 75 is connected to the other components of the circuit 22 by a main power switch 50. Power section 75 preferably includes a nine-volt battery. In alternative embodiment, other DC sources or AC rectified line sources, such as house current, may be employed.

The logic control unit 55 enables and disables other components of the load activated animal control circuit 22 in response to defined operation conditions. During no-load or "standby" operation, logic control unit 55 disables the oscillating stage 65. Additionally, the logic control unit 55 limits the number of components drawing battery current during standby operation such that a low-power circuit having extended battery life is provided.

The logic control unit 55 detects the presence of a load when an electrical contact is made between actuating surfaces, i.e., a probe contact surface and a circuit return path contact. The logic unit 55 enables the oscillating stage 65 for a limited predetermined time period according to an internal time constant. Hence, if the actuating surfaces are contacted by an immobile electrical load, such as by snow or other debris, then continued operation of the oscillating stage will be limited, for example, to a selected period of time sufficient to detect an animal, without needlessly expending battery power. After the immobile load is removed, the logic unit 55 will reset for subsequent detection of a load and further enabling of the oscillating stage.

Logic control unit 55 includes a quad CMOS Schmitt Trigger Nand Gate having a hysteresis of one third the supply voltage. As such, slight variations in logic inputs will not alter circuit operation.

Logic control unit 55 enables the oscillating stage 65 to produce an oscillating signal when simultaneous contact is made across the circuit return path surface 20 and one or more of the probe contact surfaces 14, 16 or 18. The oscillating stage 65 may be configured to provide a pulse generator.

The oscillating stage 65, when enabled, provides an oscillating signal to the threshold stage 85. The oscillating stage 65 includes a flyback oscillator for providing the oscillating signal with a magnitude larger than the supply voltage provided by the power supply stage. The oscillatory cycle continues as long as the oscillating stage 65 is enabled by the logic control unit 55.

The threshold stage 85 receives the oscillating signal and includes a peak holding circuit for storing successive positive oscillations of the oscillating signal. When a predetermined peak voltage threshold is exceeded, the threshold stage 85 activates the stimulus delivery stage 95 to deliver an electrical stimulus to the load via the probe contact surfaces. The delay caused by the ramping up of voltage to the threshold level provides a predictable and uniform positive voltage pulse for the stimulus delivery stage 95.

The stimulus delivery stage 95 amplifies the voltage of the positive pulse provided by the threshold stage 85, delivering it to the animal or other load present across the actuating surfaces of the bird feeding structure 12.

TABLE 1

Component Values

RESISTORS

62 = 10K Ω 1%
67 = 1K Ω 1%
77 = 100 Ω 1%
87 = 4.3 Ω 5%
126 = 100K Ω 1%
112 = 1M Ω 1%
120 = 100K Ω 1%
122 = 10M Ω 5%

CAPACITORS

128 = 100 µF 16 V 20%
99 = 2.2 µF 35 V
124 = .01 µF
114 = 10 µF 10 V

DIODES

69 = 6.2 V zener
79 = LED
97 = DL4934CT
110 = 1N4148
108 = DL4934CT
104 = 2 KV @ .5 A

TRANSISTORS

72 = PNP 2N3906
93 = NPN 2N3904
83 = FET ZVN4106FCT

LOGIC GATES & MISC 89, 91, 116, 118 = QUAD NAND 4093
100 = 20 V Silicone DIAC
102 = step-up transformer TR 1:100

Figure 3:
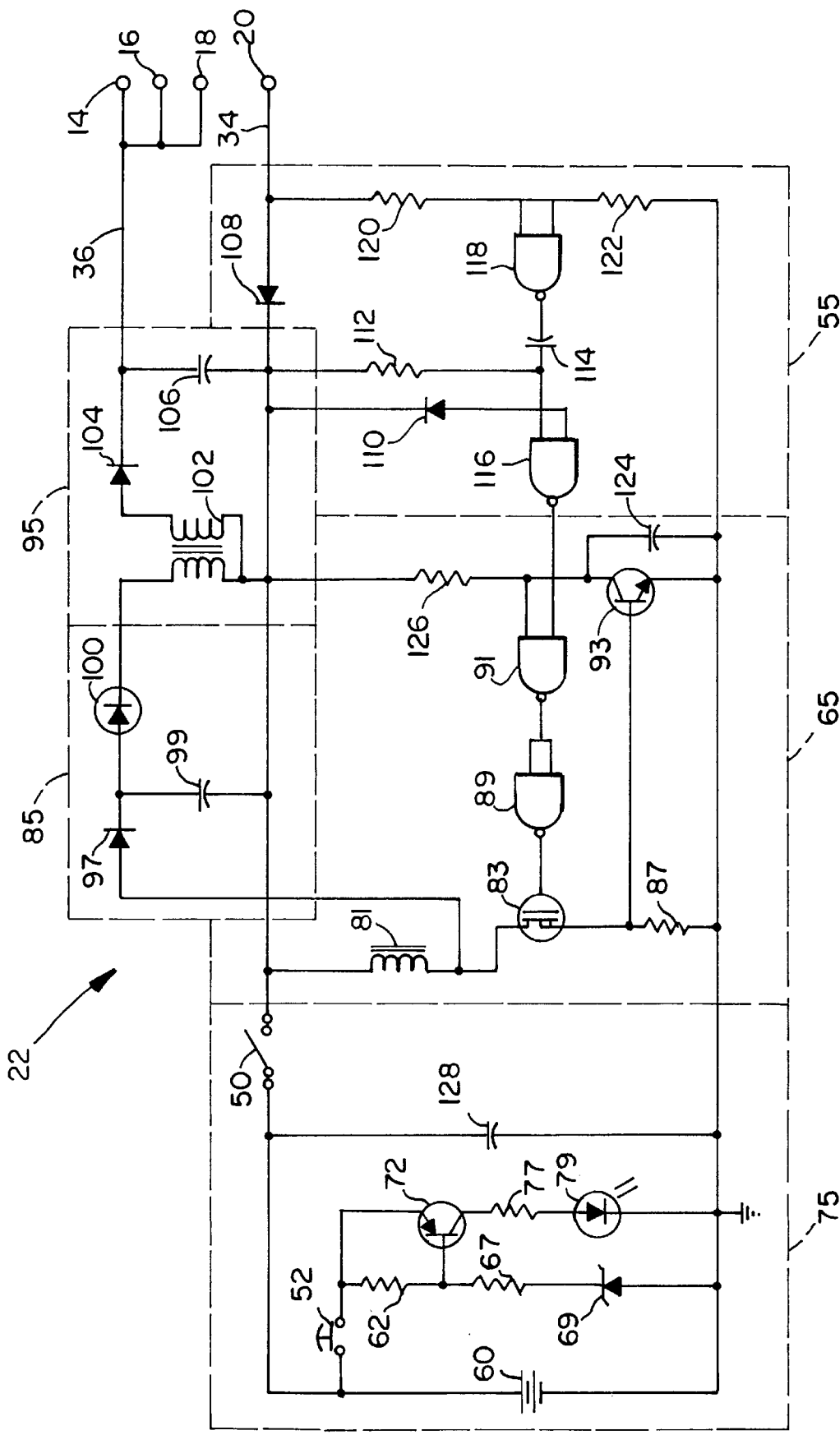
FIG. 3 is a schematic diagram of the load activated animal control system of FIG. 2.

Referring now to FIG. 3, a schematic diagram of the load activated animal control circuit 22 is shown. Main power switch 50 is placed in series with power section 75 and coil 81. The power section 75 is comprised of power source 60, low battery switch 52, resistors 62, 67, and 77, Zener diode 69, transistor 72, capacitor 128, and LED 79. Power source 60 is connected in series with battery switch 52. Connected in parallel with power source 60 and battery switch 52 is a biasing network comprised of resistor 62, resistor 67 and Zener diode 69. The collector of PNP transistor 72 is connected in series with resistor 77 and LED 79 to ground. The emitter of PNP transistor 72 is connected in series with battery switch 52 and power source 60. The base of PNP transistor 72 is connected in series with resistor 67 to the cathode of Zener diode 69 through to ground. Coupling capacitor 128 is placed in parallel across power source 60. Battery switch 52 enables PNP transistor 72 which powers LED 79 to indicate a visual status of power source 60.

Logic control unit 55 includes resistors, 120, 122, and 112; NAND gates 118 and 116; diodes 110 and 108; and capacitor 114. NAND gate 118 is connected as an inverter to the junction of a voltage divider formed by resistor 120 and resistor 122. The output of gate 118 drives the input of NAND gate 116. Connected between the input of gate 116 and the output of gate 118 is an RC network comprising resistor 112 and capacitor 114. A clamping diode 110 is connected between the input of gate 116 and the power section 75, with the anode side of diode 110 connecting to the input of gate 116.

During standby operation, no load is present between circuit return path 20 and any of the probe surfaces 14, 16 or 18. Diode 108 is reverse biased, and resistor 122 pulls the input of logic gate 118 to a low level. The low input to gate 118 forces the output of gate 118 to a high level.

The inputs to NAND gate 116 are ordinarily held at a high level by the steady state charge on capacitor 114. Hence, the output of gate 116 is ordinarily low. During steady-state operation, the probe contact surfaces are held at a high level. Because of the relatively high value of resistor 122, even a poorly conductive load connected between any of the probe contact surfaces and the circuit return path surface 20 will cause the input of NAND gate 118 to be driven to a high level. Then, the output of NAND gate 118 will be driven low, which will provide a low level input to NAND gate 116. If a load remains connected across the probe contact surface and the circuit return path surface 20 for an extended period of time, the input to NAND gate 116 will eventually return to a high level as capacitor 114 is charged via resistor 112. Then, if the extended immobile load is later removed, clamping diode 110 prevents overloading the input to NAND gate 116 when the output of NAND gate 118 returns to a high level.

As noted above, initial connection of a load across the actuating surfaces causes the input to NAND gate 116 to be driven low. Thus the output of NAND gate 116 is driven high. The high output of gate 116 is input to the oscillating stage 65. The output of NAND gate 116 will remain high for a maximum period of time determined by the RC network provided by resistor 112 and capacitor 114.

Oscillating stage 65 includes transistor 93, NAND gates 91 and 89, resistors 126 and 87, FET 83, capacitor 124, and coil 81. The output of gate 116 is connected to a first input of NAND gate 91. Hence, the output of gate 91 will ordinarily be maintained in a high condition (since the output of gate 116 is ordinarily low). NAND gate 89 is connected as an inverter to the output of gate 91. Hence, the output of gate 89 will ordinarily be held at a low level, maintaining FET 83 in a non-conducting state. The second input of NAND gate 91 is ordinarily held high by resistor 126, which also maintains capacitor 124 in a charged condition.

As noted above, when a load is initially connected between two actuating surfaces, the output of NAND gate 116 will be driven high. Hence, the output of gate 91 will be driven low, thus driving the inputs to gate 89 low and the output of gate 89 high. FET 83 will then be switched to a conductive state. The battery voltage across inductor 81 will drive current through FET 83 and resistor 87. As the voltage across resistor 87 reaches the VBE threshold of NPN transistor 93, transistor 93 will begin to conduct, discharging capacitor 124 and driving the second input of gate 91 low. The output of gate 89 will again go low, forcing FET 83 and NPN transistor 93 off. Hence, the second input to gate 91 will again be driven high. As can be appreciated, this oscillatory cycle will be repeated as long as the output of gate 116 remains high (which is limited in duration by resistor 112 and capacitor 114).

The abrupt turn off of FET 83 during activation of the oscillating stage 65 will generate a high voltage current pulse to flow through diode 97 to capacitor 99 of the threshold stage 85. The voltage across capacitor 99 will increase until the voltage reaches the threshold voltage of a threshold voltage device such as a bilateral trigger diode or DIAC 100. When the threshold is reached, the charge on capacitor 99 will be discharged through the primary coil of transformer 102 of the stimulus delivery stage 95.

In an alternative embodiment, threshold stage 85 may include a comparator circuit with one input permanently set at a voltage reference such that the comparator is triggered by an additional input voltage greater than a reference voltage. Alternatively, a Silicon Controlled Rectifier may be connected to have its gate voltage delayed until the oscillatory signal has reached the desired level.

Transformer 102 is a "step-up" transformer which increases the voltage in its secondary winding as energy is transferred from the primary winding by a degree defined by the transformer turns ratio. The transfer of energy is enabled when the threshold of DIAC 100 is reached. Diode 104 is placed in series across the secondary winding of transformer 102 to protect the system circuitry from external high voltage signals, such as lightning. The stimulus is delivered to the load, e.g. the animal in contact with the actuating surfaces in the form of probe surfaces 14, 16, 18 and return path surface 20 in order to provide an electrical shock to the animal thereby causing the animal to move away from the actuating surfaces.

The terms and expressions which have been employed are used as terms of description and not of limitation. There is no intention in the use of such terms and expressions of excluding any equivalents of the features shown and described or portions thereof.

That which is claimed is:

1. A load activated animal control system for detecting a load and delivering an electrical stimulus thereto, the system comprising:

a frame;

a pair of actuating surfaces located on said frame;

a control unit for monitoring said actuating surfaces, the control unit comprising a reverse biased diode for detecting a load across the actuating surfaces and enabling the delivery of an electrical stimulus through said actuating surfaces to the load; and a stimulus delivery stage connected with the actuating surfaces and responsive to the control unit for generating the electrical stimulus to the load across the actuating surfaces when the control unit detects the load across the actuating surfaces.

2. The apparatus of claim 1 wherein the frame is a bird feeding structure.

3. The apparatus of claim 2 wherein at least one actuating surface is a bird perch.

4. The apparatus of claim 1 wherein the frame is a barrier to deter an animal.

5. The apparatus of claim 1 wherein the distance between the actuating surfaces is dependent upon the physical dimension of the load.

6. The apparatus of claim 1 wherein the control unit disables the stimulus delivery stage in response to an immobile load across the actuating surfaces.

7. The apparatus of claim 6 wherein the control unit identifies a load as an immobile load if the load remains across the actuating surfaces for a predetermined time period.

8. A load activated animal control system for detecting a load and delivering an electrical stimulus thereto, the system comprising:

a frame;

a pair of actuating surfaces located on said frame;

a logic control unit for monitoring said actuating surfaces, the logic unit comprising a reverse biased diode for detecting a load across the actuating surfaces and enabling the delivery of an electrical stimulus through said actuating surfaces to the load;

a pulse generator enabled by said logic control unit to produce a pulsed signal when a load is detected across the actuating surfaces; and a stimulus delivery stage connected with the actuating surfaces and responsive to the pulse generator for generating the electrical stimulus to the load across the actuating surfaces.

9. The apparatus of claim 8 comprising a threshold stage responsive to said pulse generator for delaying delivery of the stimulus until the pulse signal reaches a predetermined threshold.

10. The apparatus of claim 8 wherein the logic control unit disables the pulse generator in response to an immobile load.

11. The apparatus of claim 10 wherein the logic control unit identifies an immobile load as a load present across the actuating surfaces for a predetermined time period.

12. The apparatus of claim 8 wherein the pulse generation is enabled by the logic control unit upon detection of the load across the actuating surfaces.

13. A load activated animal control system for detecting a load and delivering an electrical stimulus thereto, the system comprising:

a frame;

a plurality of actuating surfaces located on said frame;

a logic control unit for monitoring said actuating surfaces, the logic unit comprising a reverse biased diode for detecting a load across the actuating surfaces and enabling the delivery of an electrical stimulus through said actuating surfaces to the load;

an oscillating stage enabled by said logic control unit to produce an oscillating signal; and a stimulus delivery stage connected with the actuating surfaces and responsive to the oscillating stage for generating the electrical stimulus to the load across the actuating surfaces.

14. The apparatus of claim 13 wherein the oscillating stage is enabled upon detection of a load.

15. The apparatus of claim 13 comprising a threshold stage responsive to said oscillating stage for delaying delivery of the oscillating signal to the stimulus delivery stage until the oscillating signal reaches a predetermined threshold.

16. The apparatus of claim 15 wherein the oscillating stage is enabled upon detection of a load.

17. A load activated animal control system for detecting a load and delivering an electrical stimulus thereto, the system comprising:

a frame;

a pair of actuating surfaces located on said frame;

a control unit for monitoring said actuating surfaces for detecting a load across the actuating surfaces and enabling the delivery of an electrical stimulus through said actuating surfaces to the load; and a stimulus delivery stage connected with the actuating surfaces and responsive to the control unit for generating the electrical stimulus to the load across the actuating surfaces when the control unit detects the load across the actuating surfaces, wherein the control unit disables the stimulus delivery stage in response to an immobile load across the actuating surfaces.

18. The apparatus of claim 17 wherein the control unit identifies a load as an immobile load if the load remains across the actuating surfaces for a predetermined time period.

19. A load activated animal control system for detecting a load and delivering an electrical stimulus thereto, the system comprising:

a frame;

a pair of actuating surfaces located on said frame;

a logic control unit for monitoring said actuating surfaces for detecting a load across the actuating surfaces and enabling the delivery of an electrical stimulus through said actuating surfaces to the load;

a pulse generator enabled by said logic control unit to produce a pulsed signal when a load is detected across the actuating surfaces; and a stimulus delivery stage connected with the actuating surfaces and responsive to the pulse generator for generating the electrical stimulus to the load across the actuating surfaces, wherein the logic control unit disables the pulse generator in response to an immobile load.

20. The apparatus of claim 19 wherein the logic control unit identifies an immobile load as a load present across the actuating surfaces for a predetermined time period.

21. A load activated animal control system for detecting a load and delivering an electrical stimulus thereto, the system comprising:

a frame;

a plurality of actuating surfaces located on said frame;

a logic control unit for monitoring said actuating surfaces for detecting a load across the actuating surfaces and enabling the delivery of an electrical stimulus through said actuating surfaces to the load;

a pulse generator enabled by said logic control unit to produce a pulsed signal when a load is detected across the actuating surfaces;

a stimulus delivery stage connected with the actuating surfaces and responsive to the pulse generator for generating the electrical stimulus to the load across the actuating surfaces; and a threshold stage responsive to said pulse generator for delaying delivery of the stimulus until the pulsed signal reaches a predetermined threshold.

* * * * *